(No Model.)
C. D. RAAB.
ELECTRIC METER.
No. 598,209. Patented Feb. 1, 1898.
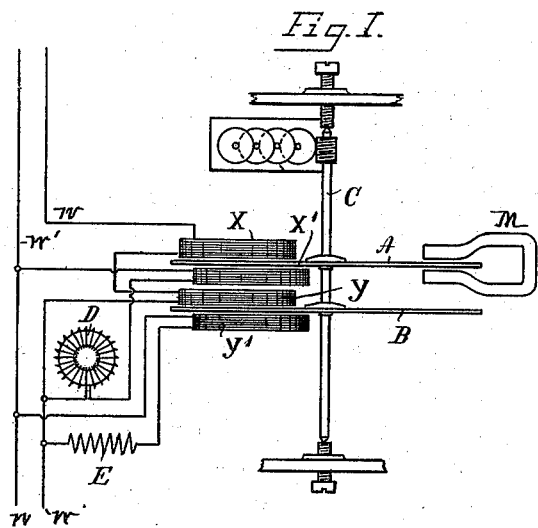
Fig. I.
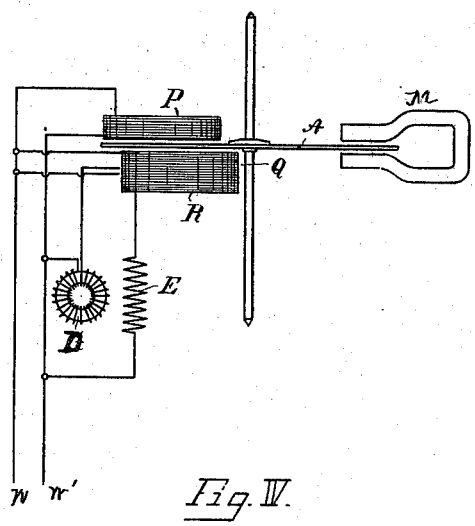
Fig. III.
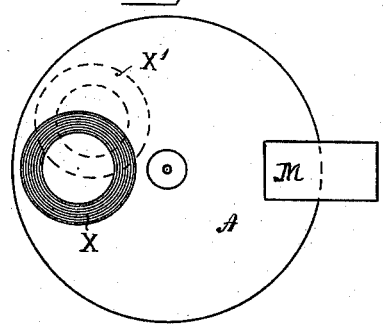
Fig. II.
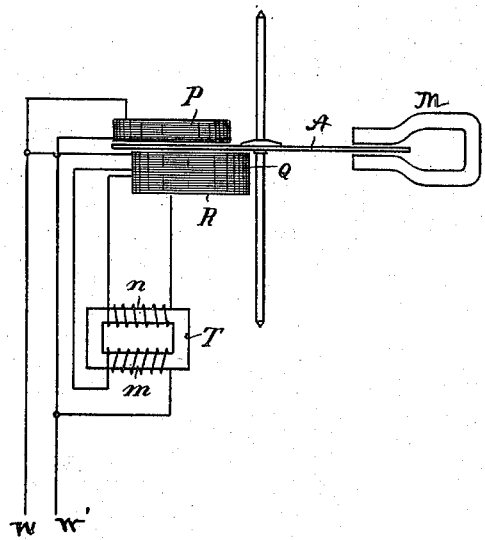
Fig. IV.
Witnesses
H. J. Pohlmann.
M. M. Robinson.
Carl Daniel Raab
By his Atty
Charles J. Kintner

UNITED STATES PATENT OFFICE.

CARL DANIEL RAAB, OF KAISERSLAUTERN, GERMANY.

ELECTRIC METER.

SPECIFICATION forming part of Letters Patent No. 598,209, dated February 1, 1898.

Application filed June 24, 1897. Serial No. 642,081. (No model.) Patented in Belgium February 27, 1897, No. 126,364.

*To all whom it may concern:*

Be it known that I, CARL DANIEL RAAB, a subject of the Emperor of Germany, residing at Kaiserslautern, in the Empire of Germany, have made a new and useful invention in Electric Meters, of which the following is a specification.

My invention is directed particularly to improvements in motor-wattmeters in which the variable shifting of the phase generated in the current-consumers or translating devices is equalized by a special shunt-field, which adapts the meter also to the induction-circuit, and patented by me in Belgium on the 27th day of February, 1897, the same being numbered 126,364.

My invention will be fully understood by referring to the accompanying drawings, when taken in connection with the following specification, reference being had to the claims hereinafter made for the features of novelty thereof.

Figure 1 is a part side elevational, and part diagrammatic view; and Fig. 2 a plan view of one form of my invention wherein the movable parts of two motors are rigidly connected together and to a meter-indicator. Figs. 3 and 4 illustrate, in side elevational view and diagram, a modified form of the invention having a motor provided with a single rotary part.

Referring now to the drawings in detail, and first to Figs. 1 and 2, A and B represent two metallic disks or armatures rigidly attached to a rotary axis C, in turn geared to an indicating-meter, as shown, X and Y being solenoids arranged concentrically and connected in series relation in the main or supply circuit $w\ w'$, X' and Y' being solenoids also concentrically arranged but displaced laterally with relation to the solenoids X and Y, so that the paired solenoids X X' Y Y' will set the armature plates or disks A and B in rotation. The coil X' is connected in shunt relation to the working circuit $w\ w'$ through a choking-coil D of well-known form, and the coil Y' is similarly connected with relation to said working circuit, including also a bifilar resistance E. M is a permanent magnet which acts upon the upper disk A in the well-known manner for the purpose of steadying the movement of the rotary part of the motor. During the operation of this form of the invention, so long as the solenoids X and Y are not influenced by self-induction, the coil X opposite the coil X' has a phase difference of nearly ninety degrees by reason of the action of the choking-coil thereon, while the coils Y and Y' have only a very slight difference of phase by reason of the action of the bifilar resistance. Consequently the motive power in this instance is applied essentially by that portion of the motor acted upon by the coils X X' and the rotary disk A. When, however, self-induction appears in the coils X and Y attributable to the insertion of motors or other translating devices in the working circuit, a portion of the motor action passes to that portion of the motor actuated by the coils Y Y' and disk B until a substantial motor action is produced, in which event that difference of phase between X and Y' disappears almost entirely, owing to self-induction manifested in the working circuit.

The following proportion is correct for the meter described, to wit: The smaller the phase difference in the motor represented by the coils X X' and disk A the more work will be performed by the motor represented by the coils Y Y and disk B, so that the motor will indicate alike in the induced or non-induced working circuit. By correctly measuring the bifilar resistance E the speed of the motor may be so determined that it, the motor, will indicate the same number of revolutions in the same load, either in an induced or non-induced main or working circuit. The shunt-coils X' and Y' are adapted to generate currents of opposite polarity, so as to thereby turn the armature or disk always in the same direction. Inasmuch as the pairs of coils X Y and X' Y' are axially located with relation to each other and as the disks or armatures A and B are set a slight distance from each other the relative pairs of coils form a common magnetic field.

In the modified form shown in Figs. 3 and 4 a single armature-disk A is used to supplant the two armature-disks A and B illustrated in Figs. 1 and 2. In this form of the invention a solenoid P is located in series relation with the main or working circuit $w\ w'$, supplanting the two solenoids X and Y illustrated in Fig. 1, and a second solenoid Q is located in multiple-arc relation with the working circuit *w w'*, including a choking-coil D, the same parts corresponding to the coil Y and choking-coil D in Fig. 1, while a third solenoid R is concentrically located with relation to the solenoid Q and included also in multiple-arc relation with the working circuit *w w'* and in series relation with a bifilar resistance E.

In the still further modified form shown in Fig. 4 the arrangement of the coils is similar to that shown in Fig. 3 except that the solenoid Q is connected in multiple-arc relation with the working circuit through one branch, *m*, and the solenoid R in a second branch, *n*, of a transformer T.

Although I have disclosed in the two modified forms of my invention shown in Figs. 1 and 3 of the drawings choking-coils D and bifilar resistances E for varying the current phase of the apparatus and in Fig. 4 a transformer T for serving a like function, I do not limit myself to these especial devices in this respect, as it is obvious that such means as would perform like functions under like conditions of operation and would readily suggest themselves to those skilled in the art might be substituted therefor.

Having thus described my invention, what I claim, and desire to secure by Letters Patent of the United States, is—

1. A motor-wattmeter for alternating currents having a rotary armature without current-supply and a coreless solenoid, in combination with two coreless shunt field-coils of like polarity so arranged as to form a common magnetic field, substantially as described.

2. A motor-wattmeter for alternating currents having a metallic rotary body without current-supply, a solenoid located in the main or working circuit, two coreless shunt field-coils including respectively a choking-coil and a bifilar resistance, substantially as and for the purpose described.

3. A motor-wattmeter for alternating currents having a metallic rotary body without current-supply, a coreless solenoid located in the main or working circuit, two coreless shunt field-coils and means operatively connected therewith for varying the current phase, substantially as described.

In witness whereof I have hereunto set my hand in presence of two witnesses.

CARL DANIEL RAAB.

Witnesses:
W. HAUPT,
E. WOLF.